US006755124B2

(12) United States Patent
Schubert

(10) Patent No.: US 6,755,124 B2
(45) Date of Patent: Jun. 29, 2004

(54) MANUALLY OPERABLE PRESS HAVING AN EMERGENCY UNLOCKING BUTTON

(75) Inventor: Werner Schubert, St. Georgen (DE)

(73) Assignee: Gebr. Schmidt Fabrik fur Feinmechanik GmbH & Co. KG, St. Georgen (DE)

( * ) Notice: Subject to any disclaimer, the term of this patent is extended or adjusted under 35 U.S.C. 154(b) by 290 days.

(21) Appl. No.: 09/732,358

(22) Filed: Dec. 7, 2000

(65) Prior Publication Data

US 2001/0022142 A1 Sep. 20, 2001

(30) Foreign Application Priority Data

Dec. 10, 1999 (DE) ........................................ 199 59 627

(51) Int. Cl.[7] .................................................. F16P 3/00

(52) U.S. Cl. ........................ 100/342; 100/353; 100/292; 100/266

(58) Field of Search ................................ 100/342, 353, 100/282, 292, 266, 341; 29/251; 72/1, 2

(56) References Cited

U.S. PATENT DOCUMENTS 3,157,112 A * 11/1964 Truhon ........................ 100/231
3,837,757 A * 9/1974 Levine ........................ 408/135
5,351,576 A * 10/1994 Matsui et al. ............... 100/282

FOREIGN PATENT DOCUMENTS

DE 0622175 * 7/1996
EP 0 622 175 B1 7/1996

* cited by examiner

*Primary Examiner*—Allen Ostrager
*Assistant Examiner*—Shelley Self
(74) *Attorney, Agent, or Firm*—Harness, Dickey & Pierce, P.L.C.

(57) ABSTRACT

A manually operable press comprises a manually pivotable actuating lever for effecting a forward press stroke and a return stroke of a press slide. A mechanical return stroke interlock inhibits a return movement of the press before the press slide has come to a lower end position of the press stroke. A cam plate within said return stroke interlock is connected for being pivoted together with the actuating lever. The cam plate has a groove-shaped guide cam provided with a plurality of lock protrusions. A spring-biased lock pin runs along the guide cam and is adapted to run freely along the guide ram in an operational direction but is inhibited by the lock protrusions within the guide cam from running in a direction opposite the operational direction. An opening each is provided in the guide cam at the lock protrusions. Unlocking pins are provided in each of the openings. The pins are adapted to be actuated from outside the press for bringing the lock pin out of engagement with the lock protrusions thus allowing the lock pin to run in the opposite direction when the unlocking pins are actuated.

9 Claims, 3 Drawing Sheets

MANUALLY OPERABLE PRESS HAVING AN EMERGENCY UNLOCKING BUTTON

FIELD OF THE INVENTION

The present invention is related to the field of manually operable presses. More specifically, the invention is related to manually operable presses comprising a manually pivotable actuating lever for effecting a forward press stroke and a return stroke of a press slide or ram, a mechanical return stroke interlock inhibiting a return movement of the press before the press slide has come to a lower end position. Still more specifically, the invention is related to such a press also having a cam plate within the return stroke interlock connected for being pivoted together with the actuating lever, the cam plate having a groove-shaped guide cam provided with a plurality of lock protrusions, a spring-biased lock pin running along the guide cam and being adapted to run freely along the guide ram in an operational direction but being inhibited by the lock protrusions within the guide cam from running in a direction opposite the operational direction.

BACKGROUND OF THE INVENTION

A manually operable press of the kind specified at the outset is disclosed in European patent specification 0 622 175 B1.

Manually operable presses of this kind are mainly used in piecework production lines where the workers are paid according to the number of the processed workpieces. Manually operable presses require to exert a force which increases towards the end of the press stroke. Workers using manually operable presses, therefore, tend to execute the work or press stroke only incompletely and to initiate the relaxation or reverse stroke already prior to having reached the intended lower dead position or end position of the press slide. As a consequence, when the press operation has not been exactly completed, the workpieces must be thrown away or at least have a minor quality.

In order to avoid such consequences, the prior art press according to the European patent specification mentioned above, has a mechanical return stroke lock comprising a cam plate with a groove-shaped control cam and a spring-biased lock pin engaging same. The control cam consists of several sections, two of them extending in a peripheral direction, whereas the third section essentially extends radially and inwardly and a fourth section extending radially outwardly and, along the periphery, back to the first section. Between the first and the second section, there is a lock protrusion which can be surmounted by the lock pin only in a direction from the first towards the second section.

The lock pin itself is spring-biased in an axial direction and is journalled within a sliding block which, in turn, is configured to be moved in a radial direction under the action of a spring.

In the course of the work stroke of the press, the lock pin first runs on the groove bottom from the first to the second section. As soon as the second section has been reached, the worker cannot move the actuating lever again back and upwardly because the lock pin will then come to rest against the lock protrusion which inhibits a further movement of the cam plate being connected for a rotation together with the actuating lever. Only during a further movement of the cam plate along the operational direction and, hence, a movement of the actuating lever downwardly, the rest pin comes into the third cam section and is there moved radially and outwardly together with the sliding block. Only now a return stroke is possible during which the lock pin runs along the fourth cam section in a peripheral direction and radially outwardly, until it again reaches the first cam section.

By doing so, it is guaranteed that the press stroke is first executed completely before the return stroke may be initiated.

However, due to faulty alignment of the workpieces to be pressed together and/or due to wrong workpiece tolerances, it may happen once in a while that the press stroke cannot be executed completely because the lower end position of the press stroke cannot be reached due to the dimensions and/or the orientations of the workpieces with respect to one another. In order to enable discharging of such faulty workpieces, the control cam of the prior art press comprises an arcuate slot being accessible from the outside making the second and the third section of the control cam accessible. If the press is jammed as described before, the lock pin may be pushed back in an axial direction from outside by introducing a thin device through the slot, thus making it possible to rotate the control cam back from that position and letting the lock pin run along the control cam in a direction opposite the operational direction.

Although this prior art press provides an efficient return stroke lock also enabling to unlock same in an emergency situation, this prior art return stroke lock nevertheless comprises a number of disadvantages in connection with the unlocking in an emergency situation.

First, it is disadvantageous to provide a relatively large slot in the groove bottom of the control cam because dirt may penetrate into the return stroke lock, in particular into the control cam. Therefore, it may happen that the control cam will be repleted with dirt, chips etc. over longer periods of time so that at the end the lock pin will be able to surmount the lock protrusion also in a direction opposite the operational direction.

A second disadvantage consists in the fact that unlocking the lock pin by means of a thin device is relatively complicated. For example It happens all the time that the device will slip off the lock pin before the latter has surmounted the lock protrusion so that the unlocking operation must be repeated several times before it is successful. This is of particular disadvantage when the device and/or the lock pin are covered with oil or another lubricant. Such time-consuming unlocking operations, further, do not make sense, in particular in connection with piecework production lines.

Still another significant disadvantage of the prior art unlocking system becomes apparent in a situation where a worker has come between the press ram and the workpiece to be processed with his finger, his hand or a piece of skin and the skin is then jammed and injured during the execution of the press stroke which may result in severe injuries. In particular in such an emergency situation, the unlocking system in the prior art press is very disadvantageous because one has found that the worker in most cases does not have enough patience to carefully locate the lock pin within the slot by means of the thin device in order to unlock same. In most cases the worker will be so nervous and impatient that he will tear his hand out of the press, thus making the injuries still worse.

Bearing the above in mind, it is an object underlying the present invention to improve a press of the kind specified at the outset such that the return stroke lock on the one hand has a very simple design and, on the other hand, may be unlocked quite easily.

SUMMARY OF THE INVENTION

According to the present invention, this object is achieved by a manually operable press comprising a manually pivotable actuating lever for effecting a forward press stroke and a return stroke of a press slide or ram, a mechanical return stroke lock inhibiting a return movement of the press before the press slide has come to a lower end position of the press stroke, a cam plate within the return stroke interlock, connected for being pivoted together with the actuating lever, the cam plate having a groove-shaped guide cam provided with a plurality of lock protrusions, a spring-biased lock pin running along the guide cam and being adapted to run freely along the guide ram in an operational direction but being inhibited by the lock protrusions within the guide cam from running in a direction opposite the operational direction, an opening each provided in the guide cam at the lock protrusions, unlocking pins provided in each of the openings, the pins being adapted to be actuated from outside the press for bringing the lock pin out of engagement with the lock protrusions, thus allowing the lock pin to run in the opposite direction when the unlocking pins are actuated.

First of all, the invention has the advantage that an unlocking pin projects outwardly from the cam plate, whereby the unlocking pin is accessible at any time and needs not to be introduced first. By providing the unlocking pin in the area of the lock protrusion, it will exactly come into contact with the lock pin when the latter comes to rest on the lock protrusion.

The inventors of the present application have found that a slot-shaped opening within the groove bottom of the control cam is not mandatory. Instead, it is sufficient to provide a bore in the area of the lock protrusion receiving the unlocking pin, because if one of the malfunction or emergency situations occur, as have been described above, the lock pin is resting against the lock protrusion anyway because the operator of the press instinctively moves the actuating lever backwards, i.e. upwardly. This becomes apparent by an impingement during the movement of the actuating lever, upon which the operator only needs to press the unlocking pin inwardly so that the lock pin is contacted in any case and it must not be expected that the unlocking pin will slide away from the lock pin.

If the opening is just a circular opening tightly receiving the unlocking pin, a further advantage of this design is that no dirt can penetrate into the guide cam because the latter is no more accessible from the outside when the opening is entirely closed by the unlocking pin received therein.

In this connection it is particularly preferred when the unlocking pin is spring-biased.

This measure has the advantage that the unlocking pin will automatically return into its initial position when it is released by the operator, after the lock pin has surmounted the lock protrusion in a direction opposite the operational direction.

Moreover, it is preferred when the unlocking pin extends parallel to the lock pin.

This has the advantage that the lowermost force is required to push the lock pin axially out of the control cam.

Still more specifically, it is preferred when the unlocking pin is interconnected with an emergency actuator button which, preferably, is arranged axially displaceable on the cam plate and, still more preferably, is captivated on a guide sleeve being attached to the cam plate from outside which, particularly, is provided with a collar associated to a shoulder on the emergency actuator button.

These measures have the advantage that although only a relatively thin unlocking pin may project into the control cam, the unlocking pin, from the exterior, however, is connected with a relatively large emergency actuator button being large enough so that the operator in a malfunction situation or an emergency situation may simply push thereon uncontrolled. Considering that most conventional manually operable presses are provided with a return spring pulling the press slide upwardly, particular advantages become apparent in situations where body members are jammed within the press. The operator, being shocked by such a situation, will immediately let the actuating lever go, whereupon the press ram will move upwardly a little bit until the lock pin impinges on the next lock protrusion. The operator may then press the emergency actuator button with his free hand, whereupon the entire return movement of the press ram in an upward direction is effected under the action of the return spring, i.e. automatically.

There is a particular advantage with the emergency actuator button if the control cam has a plurality of lock protrusions because then all of the corresponding unlocking pins may be actuated by one and the same emergency actuator button effecting that all of the unlocking pins are simultaneously inserted into the control cam.

Arranging the emergency actuator button on a guide sleeve having a collar has a plurality of design advantages. In particular when the emergency actuator button has a central opening through which fastener elements become accessible, which fastener elements are provided for attaching the guide sleeve to the cam plate, a particularly simple assembly of the manual emergency unlocking system becomes possible also in connection with already existing presses even if those are provided with the slot in the groove bottom of the control cam mentioned above.

This is because the unlocking pins may be mounted on the emergency actuator button in a correct position relative to one another, whereupon the guide sleeve may be inserted through the emergency actuator button and then be attached to the cam plate. By providing mounting bores, e.g. for corresponding bolts, it is guaranteed that the unlocking pins extend into the slot exactly in the area of the lock protrusions.

The central opening is then covered by means of a cover plate so that also in the case of such add-on solutions for existing presses, one has the advantage that any penetration of dirt into the area of the control cam is avoided because the emergency actuator button entirely covers still open areas of the slot.

Generally speaking it is still preferred when there is a compression spring provided between the emergency actuator button and the cam plate, the compression spring pushing the emergency actuator button against the collar of the guide sleeve.

This measure, too, has advantages with regard to the particular design because it is no more necessary to provide each and every unlocking pin with its own return spring. Instead, the return action is effected by the compression spring moving the emergency actuator button away from the cam plate.

Further advantages will become apparent from the description and the enclosed drawing.

It goes without saying that the features mentioned before and those that will be explained hereinafter, may not only be used in the particularly given combination, but also in other combinations or alone without leaving the scope of the present invention.

BRIEF DESCRIPTION OF THE DRAWINGS

An embodiment of the invention is shown in the drawing and will be explained in further detail within the subsequent description.

DETAILED DESCRIPTION OF THE PREFERRED EMBODIMENTS

Figure 1:
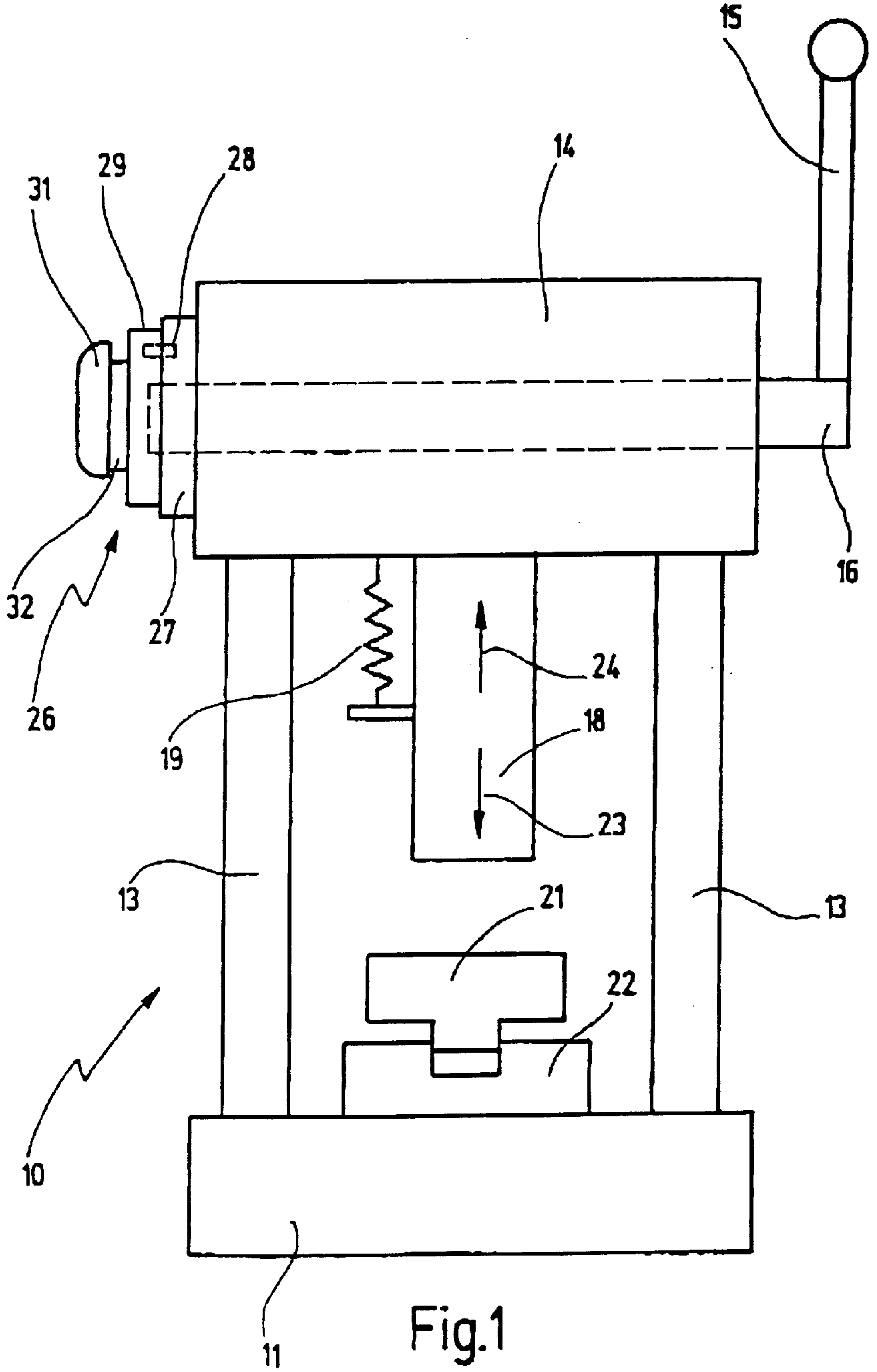
FIG. 1 shows a schematic front elevational view of a manually operable press according to the present invention.

In FIG. 1, reference numeral 10 designates a manually operable or manually operated press having a base member 11 as well as two upwardly directing posts 13. A top member 14 is attached to posts 13 and may be adjusted in its vertical position.

Press 10, further, has an actuating lever 15 being rigidly connected for rotation together with a shaft 16. Shaft 16 may be rotated or pivoted by means of actuating lever 15.

In a manner not shown in detail but evident for a person of ordinary skill, shaft 16 is connected with a press slide or ram, for example via a rack-and-pinion assembly or a knuckle joint. Via a return spring 19, press slide 18 is biased in its upper position as shown in FIG. 1.

Press 10 has the purpose of pressing a first workpiece, shown schematically at 21, together with a second workpiece, also shown schematically at 22. For that purpose, actuating lever 15 is moved downwardly so that press slide 18 effects a press stroke as indicated at 23. After completion of press stroke 23, press slide 18 returns into its upper position, shown in FIG. 1, under the action of return spring 19. Actuating lever 15 is simultaneously pivoted upwardly.

For pressing together and, thereby, interconnecting workpieces 21 and 22, the highest operational pressure must be exerted by the operator of the press in the area of the lower end position of press stroke 23. In piecework production or assembly lines, operators, therefore, tend to not move actuating lever 15 entirely downwardly.

In order to inhibit potential faulty press operations on workpieces 21, 22, press 10 is provided with a mechanical return stroke lock 26, enabling to effect return stroke 24 only after press slide 18 has reached the lower end position of press stroke 23. Return stroke lock 26 comprises a bearing disc 27 being rigidly connected to rotate with top member 14. A lock pin 28 is provided within bearing disc 27 and is adapted to move in an axial and in a radial direction therein, as will be described below. A cam plate 29 is associated to bearing disc 27. Lock pin 28 engages cam plate 29 as will also be described below.

Cam plate 29 is rigidly connected to rotate with shaft 16 such that actuating lever 15 may not be moved upwardly if there is a lock between bearing disc 27 and cam plate 29 via lock pin 28.

In order to release mechanical return stroke lock 26 from its locked condition, for example when two workpieces 21, 22 are jammed below press slide 18, so that the lower end position of press stroke 23 cannot be reached, an emergency actuator button 31 is journalled on cam plate 29 via a guide sleeve 32. As will be described in more detail below, a movement of emergency actuator button 31 to the right hand side in FIG. 1 effects a freeing or releasing of return stroke lock 26.

Figure 2:
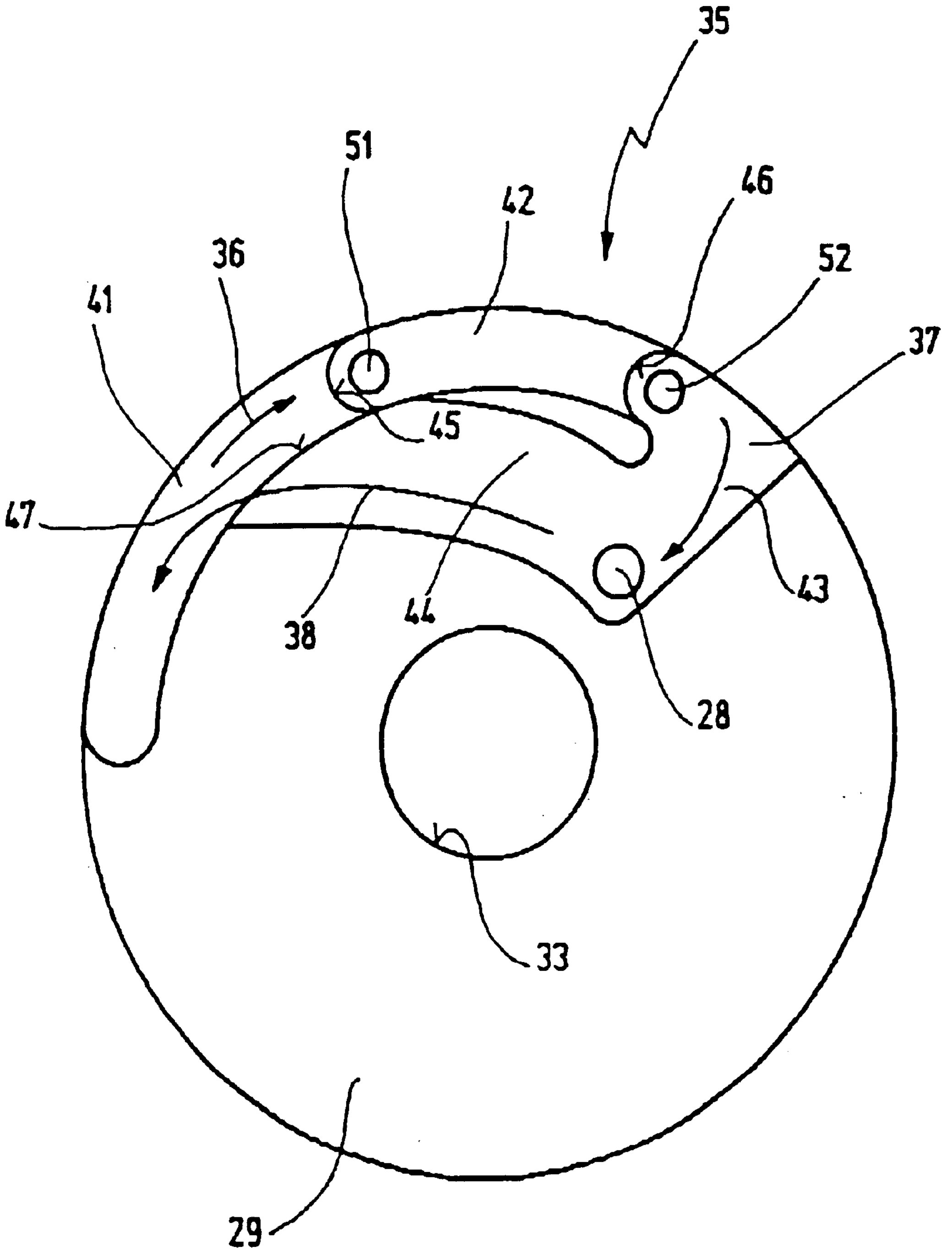
FIG. 2 shows a top plan view on a cam plate of the press of FIG. 1, as viewed from the right hand side in FIG. 1.

FIG. 2 shows cam plate 29 from FIG. 1 in a view from the right hand side. In the depiction of FIG. 2, one can see an axial hole or opening 33 through which cam plate 29 is rigidly connected for rotating with shaft 16. Further, a guide cam 35 may be seen being engaged by lock pin 28 indicated as a circle. Lock pin 28 runs along guide cam 35 in an operational direction indicated by arrows 36, 37, and 38, i.e. along a closed path. Arrow 37 indicates the inversion of rotation of cam plate 29, i.e. the condition when actuating lever 15 has been fully pressed downwardly and from which position on it will return upwardly, supported by return spring 19, for effecting return stroke 24.

Guide cam 35 comprises a first groove-shaped section 41, extending in a peripheral direction. After first section 41, there is a second groove-shaped section 42 which also extends exactly in a peripheral direction. After second groove-shaped section 42, there is a third section 43 extending essentially radially inwardly. After third section 43, there is a fourth groove-shaped section 44 extending radially outwardly and then peripherally back to first section 41.

Between first section 41 and second section 42, there is a lock protrusion 45 being configured by making section 42 deeper within cam plate 29 as compared to section 41. By doing so, lock pin 28 may surmount lock protrusion 45 only along operational direction 36. Likewise, a lock protrusion 46 is provided between second section 42 and third section 43 such that lock pin 28 being pushed into the groove bottom of guide cam 35 under the action of a spring, can only surmount lock protrusion 46 along operational direction 36. This is effected by letting second section 42 slightly rise between lock protrusion 45 and lock protrusion 46, whereas section 43 extends deeper into cam plate 29 as compared to section 44 in the area of lock protrusion 46.

Section 44 with its groove bottom then again rises along its radially outwardly directed portion such that a stop 47 is configured at 47 which may be surmounted by lock pin 28 only along operational direction 38.

Lock pin 28 is not only spring-biased in an axial direction so that it runs along the groove bottom of guide cam 35 with its front surface. Instead, it is also spring-biased radially inwardly so that when it reaches third section 43, it is automatically pushed radially inwardly, still along operational direction 37, until it assumes the position shown in FIG. 2.

Due to the axial spring load, cam plate 29 in FIG. 2 may only be again rotated in a clockwise direction when lock pin 28 has assumed its position shown in FIG. 2. If, however, during press stroke 23 workpieces 21 and 22 become so jammed that lock pin 28 comes to a stop in the area of second section 42, and, due to workpieces 21, 22 being jammed and inhibiting further advancement of press slide 18, cannot reach third section 43 because a continuation of press stroke 23 and, hence, a further movement of cam plate 29 in FIG. 2 in a counterclockwise direction is impossible, lock pin 28 will inhibit a premature return stroke 24 because it comes to rest on lock protrusion 45.

In order to allow a further return movement of cam plate 29 anyhow, there is an opening 51 in the area of lock protrusion 45. A pin, not shown in FIG. 2, acts through opening 51, and from the backside on lock pin 28 such that it is lifted from second section 42 against the action of the axially biasing spring. By doing so, lock pin 28 is lifted off second section 42 so that it may again enter into first section 41 when cam plate 29 is further rotated in a clockwise direction. A corresponding opening 52 is located in the area of lock protrusion 46.

Figure 3:
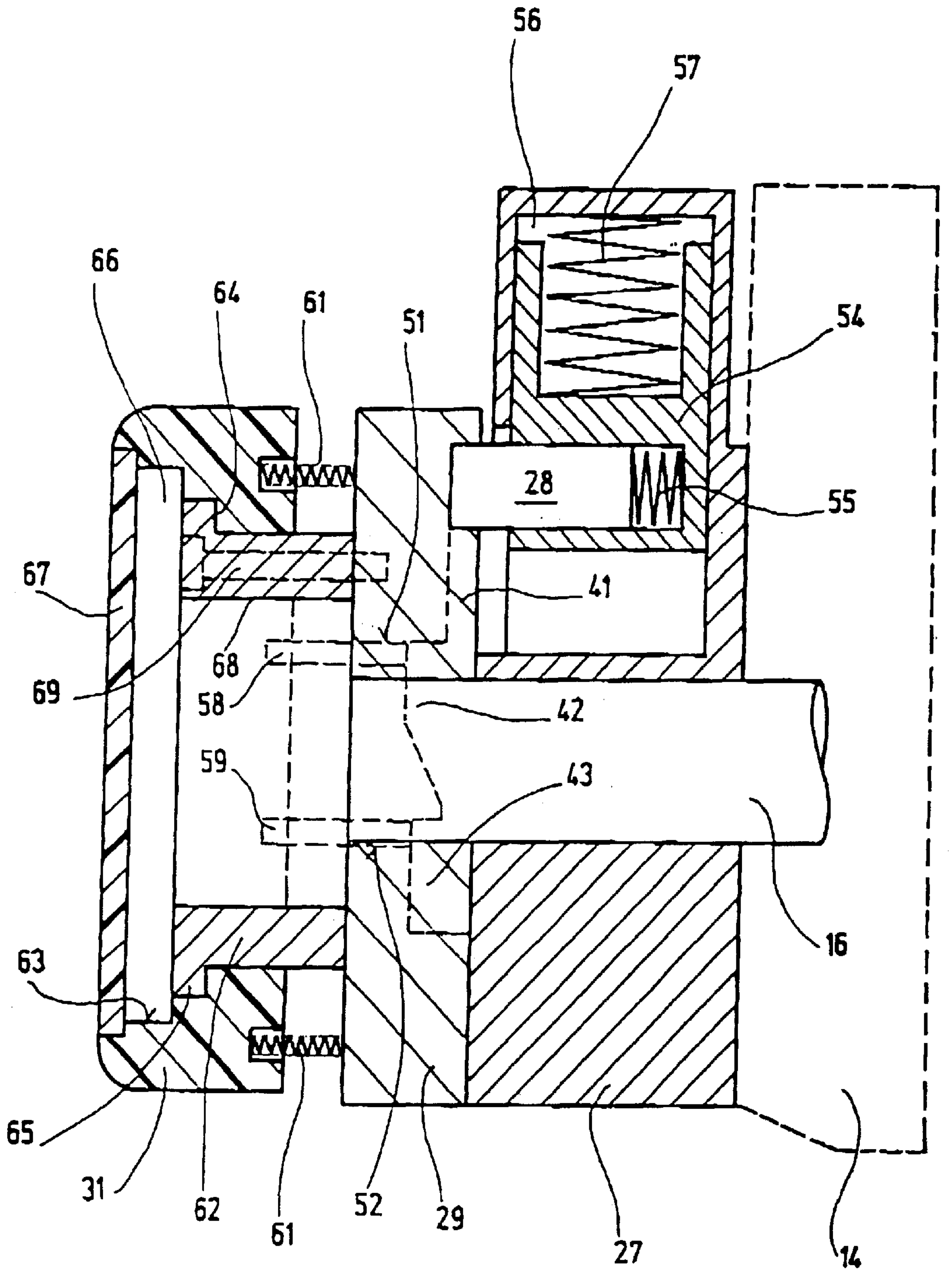
FIG. 3 is a schematic cross-sectional depiction of a mechanical return stroke lock provided with the emergency actuator button of FIG. 1.

By means of FIG. 3, it shall now be explained how the above-indicated manual emergency unlocking assembly is designed and how it works.

First of all, one may take from FIG. 3 that lock pin 28 is seated in a sliding block 54 and is axially biased via a spring 55 such that it is pushed to the left hand side in FIG. 3. Sliding block 54, in turn, is seated within a radially and outwardly extending guide 56 and is likewise biased by a spring 57 pushing sliding block 54 radially and inwardly towards shaft 16. By doing so, lock pin 28 is spring-biasedly axially outwardly and radially inwardly, thus effecting that it follows guide cam 35 during movement of cam plate 29. In FIG. 3, guide cam 35 is only indicated in dashed lines and schematically, comprising sections 41, 42, and 43. In the cross-sectional depiction of FIG. 3 it may well be seen that there are steps each configured between sections 41 and 42 and between sections 42 and 43. Lock pin 28 comes to rest on these steps if it is moved through guide cam 35 (FIG. 2) against the operational direction. Further, one may easily appreciate that the depth of the groove decreases from the area of section 42 towards section 43, thereby configurating the step and, respectively, a corresponding lock protrusion.

Unlocking pins 58 and 59, respectively, are seated in the two openings 51 and 52 already described in connection with FIG. 2. Unlocking pins 58 and 59 may be shifted to the right hand side in FIG. 3, whereby lock pin 28 is likewise shifted against the action of a spring 55 to the right hand side such that it may surmount the corresponding step or protrusion within guide cam 35. Unlocking pins 58 and 59 are located within emergency actuator button 31 already discussed in connection with FIG. 1. A plurality of compression springs 61 are journalled against emergency actuator button 31, two of them being shown in FIG. 3. Compression springs 61 are seated between cam plate 29 and emergency actuator button 31 so that unlocking pins 58, 59 are biased to the left hand side in FIG. 1 through compression springs 61 which, by the way, extend parallel to lock pin 28.

Emergency actuator button 31 is arranged on cam plate 29 to be axially displaced and is captivated on a guide sleeve 62 attached to cam plate 29 from outside. For that purpose, emergency actuator button 31 is provided with a stepped bore 63, the diameters of which increase stepwise to the left hand side in FIG. 3. During the transition from the smallest to the smallest but one diameter, emergency actuator button 31 configurates a shoulder 64 on which guide sleeve 62 comes to rest with a collar 65. By doing so, it is guaranteed that emergency actuator button cannot be pushed too far away from cam plate 29 to the left hand side under the action of compression springs 61.

If emergency actuator button 31 in FIG. 3 is pushed to the right hand side, unlocking pins 58 and 59 are displaced into sections 42 and 43. This displacement is possible because there is a clearance 66 above collar 65 on the left hand side in FIG. 3. Collar 65 may enter into clearance 66 when emergency actuator button 31 is displaced towards cam plate 29.

Emergency actuator button 31, further, comprises a recess covered by a cover or cover plate 67. During the assembly of emergency actuator button 31 on cam plate 29, the recess first remains open in order to allow a fastening of guide sleeve 62 on cam plate 29. For that purpose, axially extending through-holes for fastening bolts, one of them being shown in FIG. 3 at 69, are provided in an exterior wall 68 of guide sleeve 62.

The assembly is made such that first compression springs 61 as well as unlocking pins 58 and 59 are mounted on emergency actuator button 31 before guide sleeve 62 is inserted through stepped bore 63 from the left hand side in FIG. 3. Then the assembly is seated from the left hand side on cam plate 29 to which it is fastened by means of bolts 69. When doing so, one has to make sure that unlocking pins 58 and 59 are inserted into corresponding openings 51 and 52. Emergency actuator button 31 is then pushed against collar 65 through compression springs 61. The recess is then closed by means of cover 67.

Finally, it should be mentioned that the embodiment shown is provided with two lock protrusions for lock pin 28, this being just an example because cam plate 29, of course, may also be provided with only one such lock protrusion or with more than two.

What we claim is:

1. A manually operable press comprising:

a press slide;

a manually pivotable actuating lever for effecting a forward press stroke and a return stroke of said press slide; and a mechanical return stroke interlock device inhibiting a return movement of said press slide before said press slide has come to a lower end position of said press stroke, said return stroke interlock device having:

a cam plate pivotably connected to said actuating lever for being pivoted together therewith and having a groove-shaped guide cam provided with a plurality of lock protrusions, a spring-biased lock pin running along said guide cam and being adapted to run freely along said guide cam in an operational direction but being inhibited by said lock protrusions within said guide cam from running in a direction opposite said operational direction, an opening provided in said guide cam at each of said lock protrusions, and unlocking pins provided in each of said openings, said unlocking pin being adapted to be actuated from outside said press for bringing said lock pin out of engagement with said lock protrusions thus allowing said lock pin to run in said opposite direction when said unlocking pins are actuated.

2. The press of claim 1, wherein said unlocking pins are spring-biased.

3. The press of claim 1, wherein said unlocking pins extend parallel to said lock pin.

4. The press of claim 1, wherein said unlocking pin is interconnected with an emergency actuator button.

5. The press of claim 4, wherein said emergency actuator button is arranged axially displaceable on said cam plate.

6. The press of claim 4, wherein said emergency actuator button is coupled to a guide sleeve being attached to said cam plate from outside.

7. The press of claim 6, wherein said guide sleeve is provided with a collar cooperating with a shoulder on said emergency actuator button.

8. The press of claim 6, wherein said emergency actuator button is provided with an axial opening, fastener elements being accessible through said opening, said fastener elements being provided for attaching said guide sleeve to said cam plate.

9. The press of claim 7, wherein at least one compression spring is provided between said emergency actuator button and said cam plate, said compression spring pushing said emergency actuator button against said collar of said guide sleeve.

* * * * *